(12) United States Patent
Casado Abarquero et al.

(10) Patent No.: US 8,118,253 B1
(45) Date of Patent: Feb. 21, 2012

(54) AUXILIARY POWER UNIT (APU) OF AN AIRCRAFT

(75) Inventors: Hugo Casado Abarquero, Madrid (ES); Carlos Casado Montero, Madrid (ES)

(73) Assignee: Airbus Operations, S.L., Getafe (Madrid) (ES)

( * ) Notice: Subject to any disclaimer, the term of this patent is extended or adjusted under 35 U.S.C. 154(b) by 587 days.

(21) Appl. No.: 12/318,796

(22) Filed: Jan. 8, 2009

(30) Foreign Application Priority Data

Oct. 24, 2008 (ES) ................. 200803020

(51) Int. Cl.
*B64D 41/00* (2006.01)
(52) U.S. Cl. ............................ 244/58; 60/39.21
(58) Field of Classification Search .......... 244/58, 244/75.1, 60; 60/39.21, 39.15
See application file for complete search history.

(56) References Cited

U.S. PATENT DOCUMENTS

| | | | |
|---|---|---|---|
| 4,043,120 A | 8/1977 | Hoffeins | |
| 4,312,179 A | 1/1982 | Zaugg | |
| 4,494,372 A | 1/1985 | Cronin | |
| 4,864,812 A | 9/1989 | Rodgers et al. | |
| 5,201,798 A | 4/1993 | Hogan | |
| 2004/0124308 A1* | 7/2004 | Daggett | 244/58 |
| 2005/0103931 A1* | 5/2005 | Morris et al. | 244/58 |
| 2006/0237583 A1* | 10/2006 | Fucke et al. | 244/58 |
| 2007/0284480 A1* | 12/2007 | Atkey et al. | 244/135 R |

FOREIGN PATENT DOCUMENTS

EP   1 630 099   3/2006

* cited by examiner

*Primary Examiner* — Christopher P Ellis
(74) *Attorney, Agent, or Firm* — Wenderoth, Lind & Ponack, L.L.P.

(57) ABSTRACT

An Auxiliary Power Unit (APU) includes a power module (1) to be supplied with fuel (2), a gearbox (5), an electric generator (6), and an element selected from a compressor (4), a hydraulic pump and a combination thereof, in order to provide a functioning mode for production of power selected from electric (8), pneumatic (7), hydraulic and a combination thereof; the APU presents the novelty of including an electric motor (9), integrated into the electric generator (6), with the electric motor (9) and the electric generator (6) connected to the power module (1) via the gearbox (5*a*) and a main clutch (10). Moreover, the compressor (4) and/or the hydraulic pump are also connected to the power module (1) via the gearbox (5*a*) and the main clutch (10). Also, the compressor (4) and/or hydraulic pump are connected to the power module (1) via the gearbox (5*a*) and the main clutch (10). This architecture permits the functioning modes of the APU to be extended, increasing its performance and reducing harmful environmental effects.

8 Claims, 5 Drawing Sheets

AUXILIARY POWER UNIT (APU) OF AN AIRCRAFT

OBJECT OF THE INVENTION

Auxiliary power units (APU) are conventionally included in aircraft, to provide aircraft with autonomy. The APU present typical harmful effects on the environment in airports, such as acoustic contamination, and air pollution. In addition, the operation of the aircraft on the ground can require three types of external power sources: electric, high or low pressure pneumatic, and hydraulic.

The object of the invention is to offer a versatility of use capable of reducing the harmful environmental effects as well as facilitating the operation of the aircraft on the ground by reducing the number and the type of external is power sources.

The invention provides different functioning modes depending on the needs required from the auxiliary power unit as it is described further below.

BACKGROUND OF THE INVENTION

Modern aircraft, mainly large size ones, normally contain an auxiliary power unit (APU) comprising a power module (engine) supplied with fuel, a pneumatic compressor, and/or a hydraulic pump, a gearbox and one or several electric generators, in order to provide electric, pneumatic or hydraulic power, or a combination thereof. The main use of the APU is intended for aircraft when they are on the ground, with the main motors switched off, and the aircraft cannot be supplied with the electric, pneumatic or hydraulic external power necessary for the desired use of it.

The power source that is most easily available in airports nowadays is electric power. On the other hand, the most difficult power source to be available is high-pressure pneumatic power. When the aircraft is on the ground and the environmental conditions are at their most extreme, due to very cold or hot temperatures with or without the combination of high moisture, it is more necessary to fit the cabin (the cabin being understood as the area that has to be kept pressurized in flight) for the comfort of the passengers, crew and operators, with the consequent increase in the demand for power, and the use of the APU becomes habitual and more critical on account of the shortcoming mentioned above.

The conventional arrangement described above presents the drawback of the noise produced, and the fuel consumed during its functioning, which produces acoustic contamination and air pollution.

This mode of functioning permits complete autonomy of the aircraft but it implies a considerable operating cost for the airlines. In addition, it is expected that greater restrictions or penalties will exist in the future on the use of the APU, as a result of national, international or airport regulations, for acoustic and/or environmental reasons.

DESCRIPTION OF THE INVENTION

In order to solve the drawbacks stated above, the invention proposes a new architecture for the auxiliary power unit (APU), which, as with conventional ones, comprises a power module (engine) supplied with fuel, a pneumatic compressor and/or a hydraulic pump, a gearbox and an electric generator in order to permit a functioning mode for generating electric, pneumatic or hydraulic power to be provided, or any combination thereof to be used simultaneously; but with the novelty of also including an electric motor for which the electric generator can also function as an electric motor (due to the reversibility of the electrical machines), in such a way that the electric generator/motor is connected to the power module via the gearbox and via a main clutch. Equally, the compressor and/or hydraulic pump are connected to the power module via the gearbox and via the main clutch, which provides an architecture that permits different functioning modes for the generation of electric power in combination with a power selected from pneumatic, hydraulic and a combination thereof, in a similar way to the one conventionally done but which also permits a functioning mode for the production solely of pneumatic and/or hydraulic power, without starting up the power module (engine) and by means of the electric motor that is fed with external electric power, unlike in the state of the art in which the said start-up is required to be performed in order to supply pneumatic and/or hydraulic power. For the conventional autonomous functioning mode, in other words, without the need of electric, pneumatic or hydraulic external power supply, the main clutch is kept coupled, but for the case of the functioning mode solely for the generation of pneumatic and/or hydraulic power, without starting up the power module, the main clutch is kept decoupled, with the pump an/or compressor being fed via the external power supply and by means of the electric motor.

In an embodiment of the invention, the compressor and/or the hydraulic pump are connected to the power module via a secondary clutch of the gearbox and via the main clutch, in such a way that provides an architecture that permits a greater number of functioning modes for the generation of electric, pneumatic or hydraulic power, or for any combination thereof to be used simultaneously, in a similar way to what is conventionally done, but, on the basis of the described modes, this architecture also permits a start-up mode of the power module with electric power supply that is internal or external to the aircraft.

For the conventional functioning mode, it means, without any need of electric, pneumatic or hydraulic external power supply, both the main clutch and the secondary clutch are kept coupled with the power module functioning. If electric power is the only one to be generated, the main clutch is kept coupled and the secondary one is decoupled; in this way no power is lost due to the pneumatic compressor and/or the hydraulic pump dragging on the power module.

For the functioning mode for generation of pneumatic and/or hydraulic power with external electric power supply, the APU is capable of generating pneumatic and/or hydraulic power, keeping the main clutch decoupled and the secondary clutch coupled, with the power module switched off and the electric motor turning the pneumatic compressor and/or the hydraulic pump via the gearbox.

For the functioning mode for start-up of the power module, the electric motor can be fed by internal power sources, such as batteries or other means of the aircraft, or by external sources. In this case the main clutch is coupled and the secondary one is coupled or decoupled, though due to considerations of improved reliability and necessary power, during start-up it will typically be decoupled.

In order to achieve the entire functionality mentioned above, the invention provides the incorporation of a control module for the power unit, which comprises means of establishment a functioning mode selected from a mode for simultaneous generation of pneumatic, electric and hydraulic power, a functioning mode for simultaneous generation of pneumatic and electric power, a mode for simultaneous generation of hydraulic and electric power, a mode for the production solely of electric power with the electric generator acting by means of the power module, a mode for the production solely of pneumatic or hydraulic power with power supply external to the aircraft, the compressor or the hydraulic pump being turned by the electric motor; and a start-up mode for the power module by means of the electric motor and with the pneumatic compressor and/or the hydraulic pump being typically kept decoupled.

The invention provides the possibility of incorporating control modules independent of the clutches and independent of the power module, in order to embody the functionality mentioned above.

A possible arrangement includes a gearbox with the coaxial shafts integrated into concentric shafts comprising the elements selected from the electric motor, the electric generator, the main clutch, the secondary clutch, the pneumatic compressor, the hydraulic pump and a combination thereof. As a consequence, the coaxial shafts are combined with non-coaxial shafts, in other words, some of the above elements are mounted on coaxial shafts and others on non-coaxial shafts.

The functioning modes that are described are above all intended for their application when the aircraft is on the ground and the main motors are switched off, though that they can be also activated in flight, particularly the functioning mode in which it is required to generate electrical energy without generating pneumatic energy.

As the electric motor and the electric generator are the same physical component, it is constituted as the source of generation for electric power or as the consumer of it.

Moreover, the stated benefits are achieved at the cost of a more complex gearbox with a potential impact on weight and reliability, which is more pronounced in the case of both clutches are included rather than just one.

Below, in order to facilitate a better understanding of this descriptive specification and as an integral part thereof, a series of figures is attached in which the object of the invention has been represented by way of illustration and non-limiting.

DESCRIPTION OF THE PREFERRED FORM OF EMBODIMENT

Given below is a description of the invention based on the figures commented above.

Figure 1:
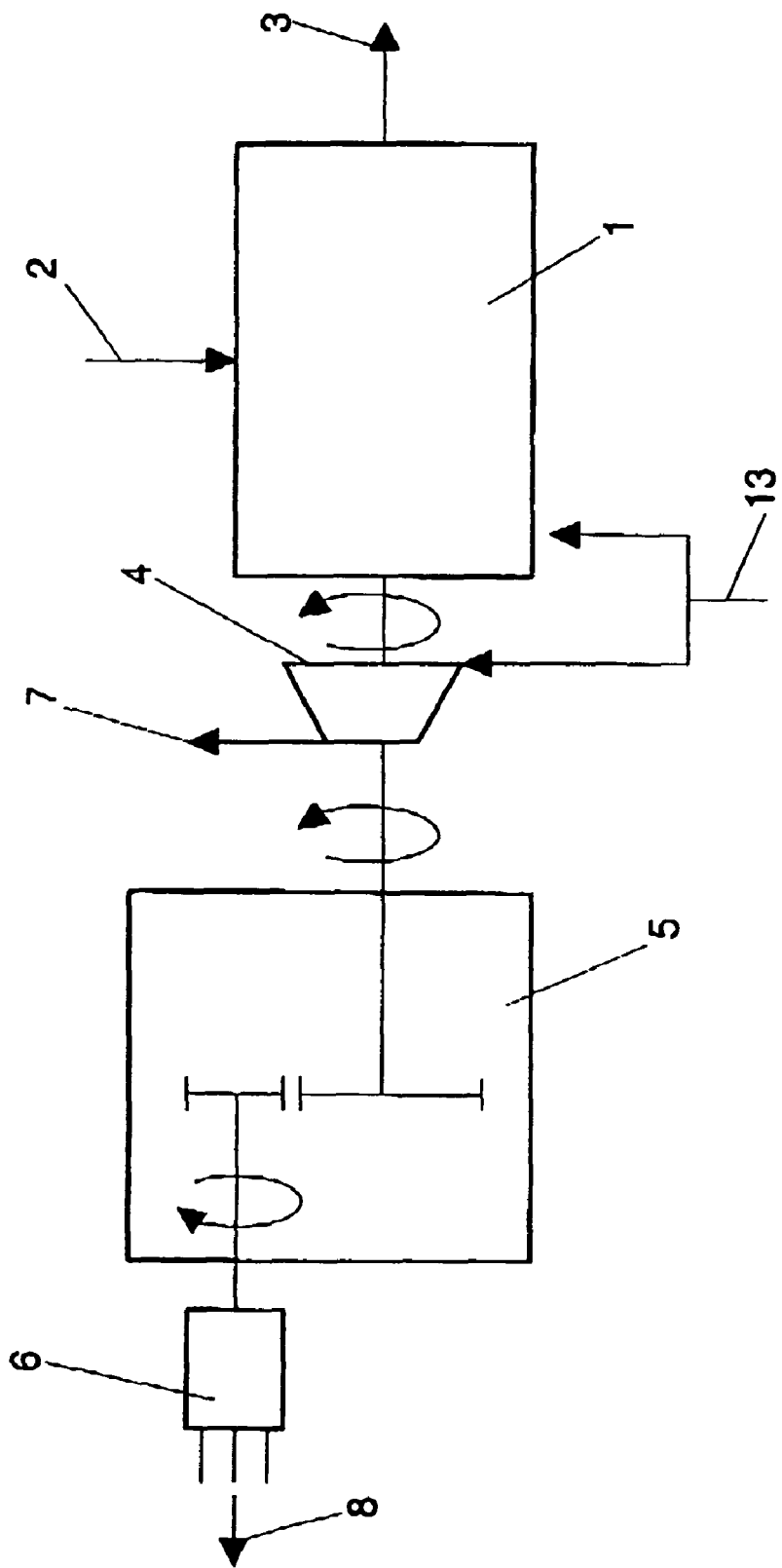
FIG. 1.—Shows a schematic representation of the architecture of a conventional APU.

First of all, and with the aid of FIG. 1, it is made a brief description of the arrangement of a conventional APU which includes a power module 1 supplied with fuel 2, with a smoke exhaust 3 and an air intake 13, which is also applied to a compressor 4 for providing pneumatic power 7. It also comprises an electric generator 6 for generating electric power 8. In this architecture it is necessary to incorporate a gearbox 5 in order to adjust the different speeds of rotation needed between the power module 1 and the electric generator 6 for generating electric and/or pneumatic power. Moreover, provision is conventionally also made for the APU to be able to generate hydraulic, pneumatic or electric power, or any combination thereof, for which, instead of the compressor 6, or parallel with it, a hydraulic pump is included, said hydraulic pump has not been represented in order to simplify the figure and to facilitate the explanation of the invention.

This type of architecture presents the drawback that acoustic and air pollution are generated when the different powers are produced starting from the functioning of the engine constituting the power module, as was described above.

In order to solve these drawbacks, the invention provides a new structure of APU, which incorporates a power module 1 supplied with fuel 2, with a smoke exhaust 3 and an air intake 13, but with the particular feature that said module 1 is joined to the compressor 4 by means of a main clutch 10 and a secondary clutch 11, which in the example of embodiment are included in the gearbox 5a, though they can just as well be outside of it.

In addition, the main clutch 10 constitutes the means of connection of the power module 1 with the electric generator 6 and with an electric motor 9. The electric generator 6 and the electric motor 9 have a common shaft and are integrated into a single physical element, and the electric generator 6 and the electric motor 9 are connected via the gears of the gearbox 5a in order to permit the production of energy (electric generator) and the consumption of said energy (electric motor), in such a way that the consumption and generation of power can be carried out conventionally, as it is known in other applications.

On the basis of the described architecture, it is easily understood that by means of a control module (not represented), the different elements that are described are permitted to work in order to achieve different functioning modes.

Figure 2:
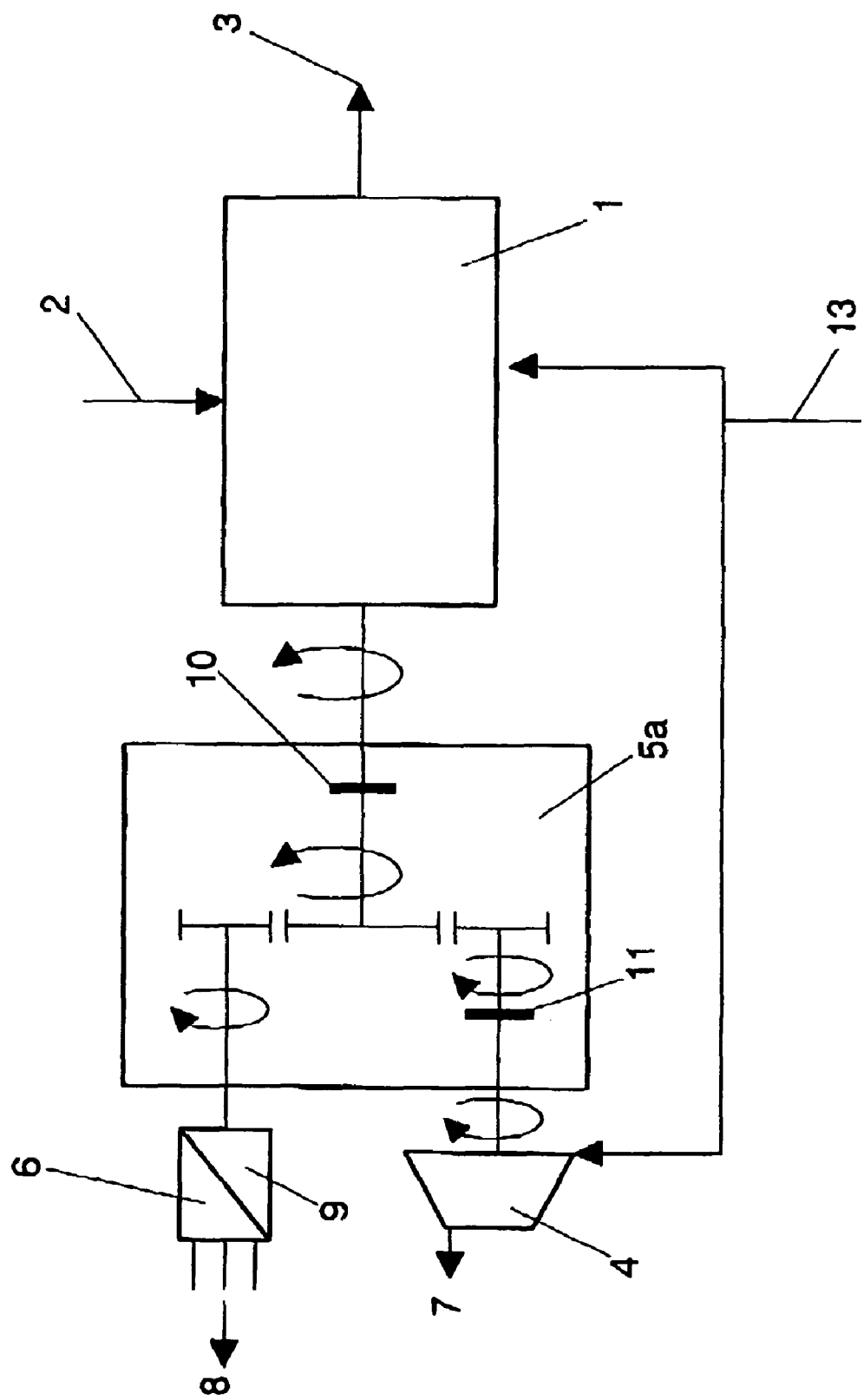
FIG. 2.—Shows a schematic representation of an embodiment of the APU of the invention that includes a main clutch and a secondary clutch, and which provides a functioning mode in which electric and pneumatic power are generated simultaneously.

So, the described architecture also permits the generation of electric power 8 and pneumatic power 7 simultaneously, for which the main clutch 10 and the secondary clutch 11 are coupled, such that the rotation of the power module 1 is transmitted via the gearbox 5a to the electric generator 6 and to the compressor 4, as represented in FIG. 2.

Figure 3:
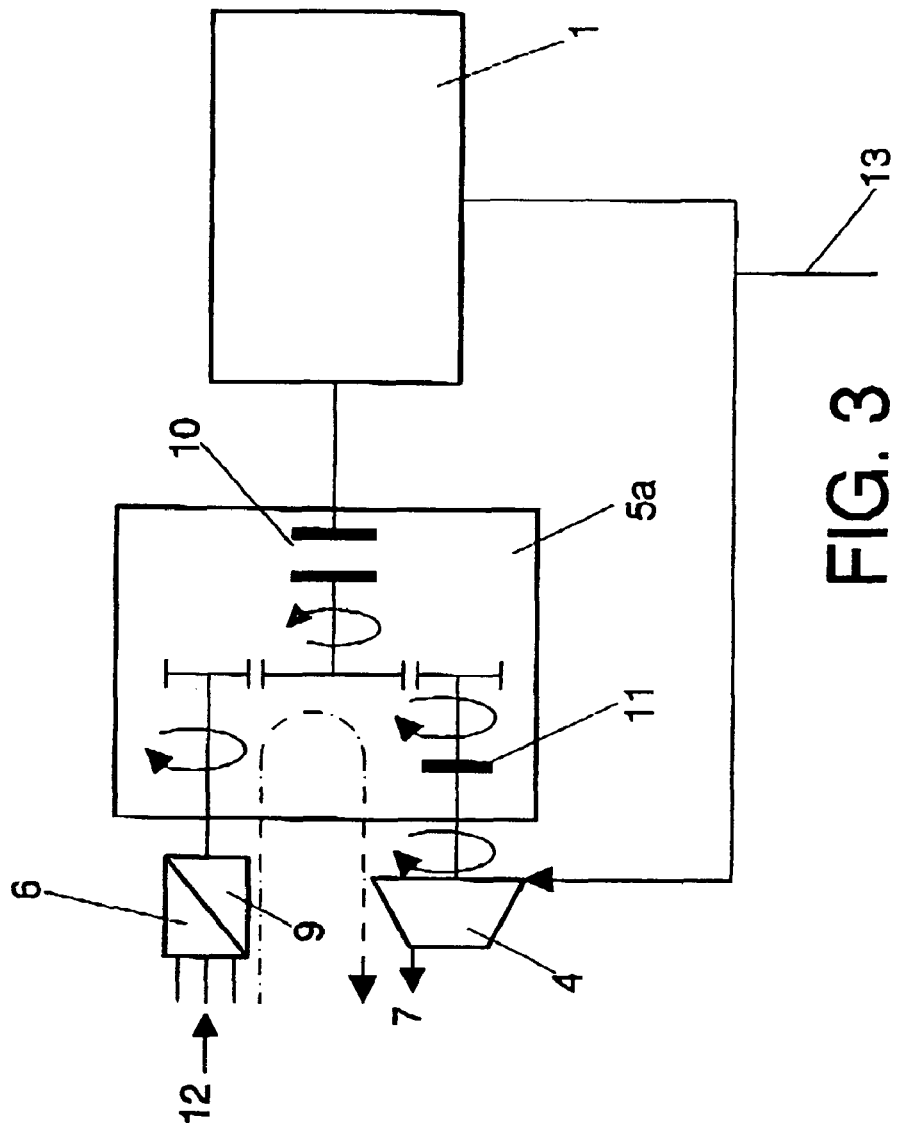
FIG. 3.—Shows a schematic representation equivalent to the above figure but for the case in which the APU of the invention solely generates pneumatic power by means of using external electric power.

Furthermore, by means of the control module, a selection can be made between a functioning mode for the production of solely pneumatic power, as shown in FIG. 3, where the main clutch 10 is decoupled and the secondary clutch 11 is coupled. In this case the electric motor 9 is fed by electric power 12 available in the airport. This power being more easily available in the airport than pneumatic power (especially at high pressure), such that in this case the pneumatic power 7 is generated using the compressor 4 electrically driven by the electric motor 9 via the gearbox 5a.

The dashed lines show the flow of actuation of the different elements of the APU.

Figure 4:
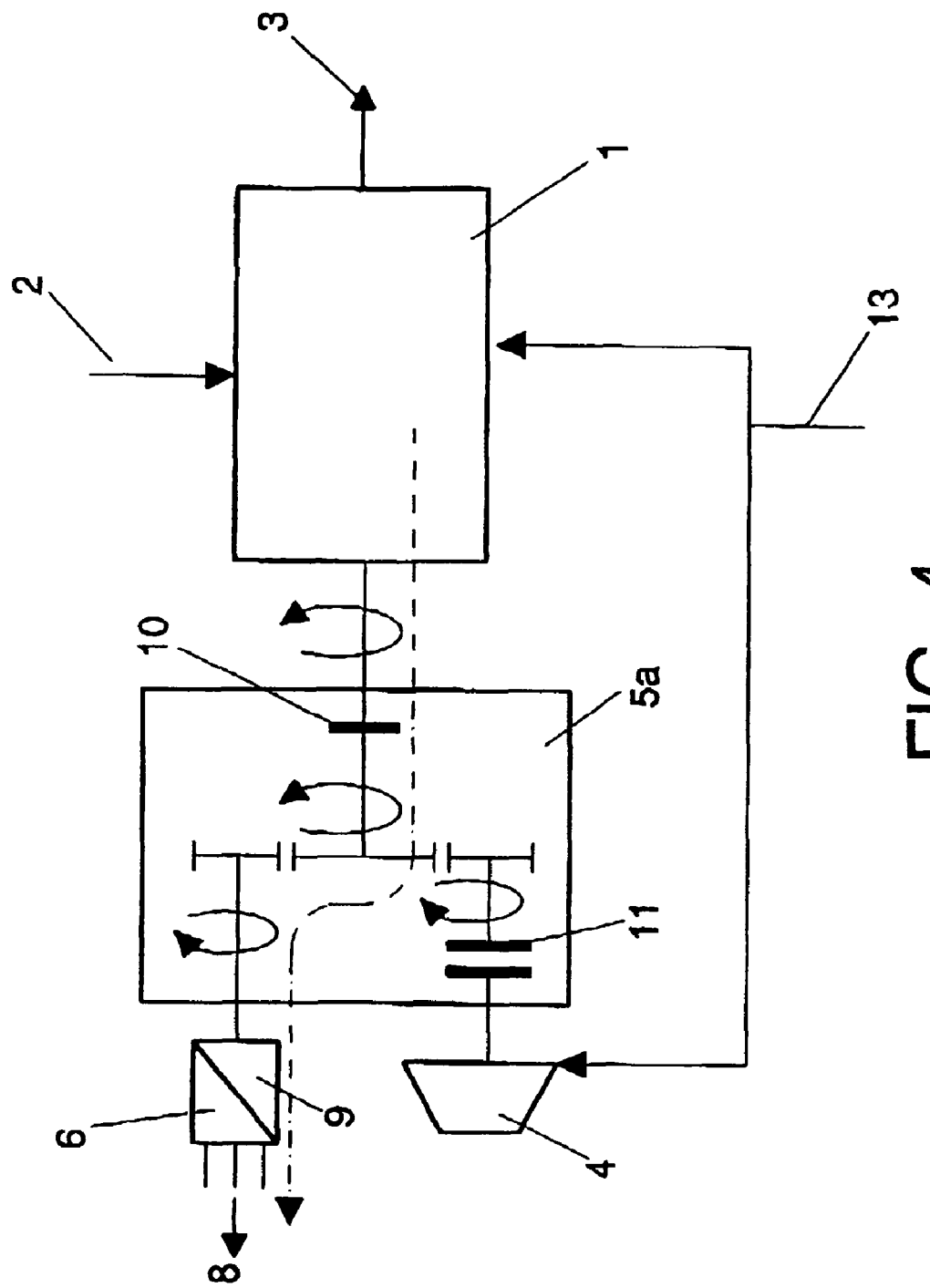
FIG. 4.—Shows a schematic representation of the APU of the invention similar to the one represented in FIGS. 2 and 3, but for the generation solely of electric power by means of using the power module.
Figure 5:
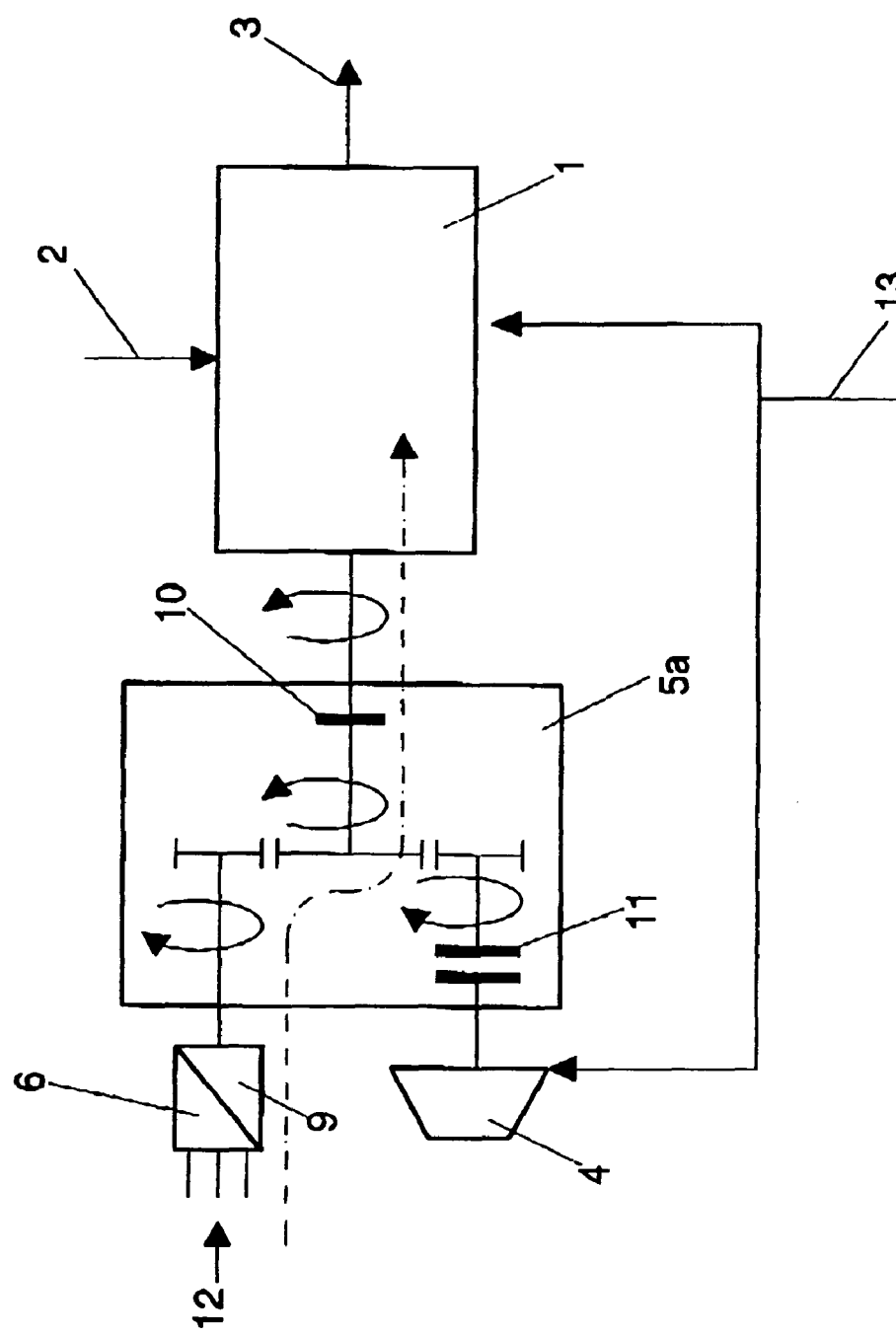
FIG. 5.—Shows a schematic representation of the APU of the invention similar to the one represented in FIGS. 2 to 4, but for the start-up functioning mode of the power module.

Moreover, the control module permits a functioning mode for the generation solely of electric power, as shown in FIG. 4, for which the main clutch 10 is coupled and the secondary clutch 11 is decoupled, and in such a way that the power unit 1 drives just the electric generator 6 providing the electric power 8. This arrangement has the advantage that the compressor 4 is not operational in this functioning mode, thereby eliminating the parasitic power used for turning the compressor and reducing the necessary power that a conventional APU requires.

The control module also permits a functioning mode to be selected in order to carry out the start-up of the power module 1 by means of the electric motor 9 which is fed with electric power 12 from ground equipment provided in the airport. In this case, the main clutch 10 is coupled and the secondary clutch 11 is decoupled, in such a way that the electric motor 9 causes the angular displacement and start-up of the power module 1 via the gears and via the main clutch 10 of the gearbox 5a.

This arrangement offers a versatility that simplifies and optimizes the normal sequences of operation of the APU. So, in order to start up the APU, as the secondary clutch 11 is decoupled and the compressor 4 is isolated, the application of parasitic resistance from the pneumatic compressor 4 during the start-up of the power module 1 is prevented, This arrangement makes that the energy expenditure for achieving start-up is less and the reliability of start-up is increased. It is also provided the possibility that, in order to start up the power unit 1, the electric motor 9 is fed by internal power sources, such as batteries or similar (not represented). In this option the secondary clutch 11 can be coupled, though for the reasons stated it is obviously preferable for the said secondary clutch 11 to be decoupled.

It is obvious that the electric generator 6 and the electric motor 9 are fitted with the appropriate means of oil cooling that are typically included in the gearbox 5a.

The invention claimed is:

1. An auxiliary Power Unit of an aircraft, comprising:
a power module (1) to be supplied with fuel (2);
a gearbox (5a);
an electric generator (6); and
an element comprising at least one of
a compressor (4), and
a hydraulic pump, and
in order to provide a functioning mode for production of power comprising at least one of
electric power (8),
pneumatic power (7), and
hydraulic power;
wherein an electric motor (9) is integrated into the electric generator (6), and the electric motor (9) and the electric generator (6) are connected to the power module (1) via the gearbox (5a) and via a main clutch (10) in a manner such that said element is also connected to the power module (1) via the gearbox (5a) and the main clutch (10).

2. An auxiliary Power Unit of an aircraft, according to claim 1, wherein said element is connected to the power module (1) via a secondary clutch (11) of the gearbox (5a) and via the main clutch (10).

3. An auxiliary Power Unit of an aircraft, according to claim 1, further comprising a control module fitted with means for establishing a functioning mode selected from:
a mode for simultaneous generation of pneumatic, electric and hydraulic power;
a functioning mode for simultaneous generation of pneumatic power (7) and electric power (8);
a mode for simultaneous generation of hydraulic power and electric power (8);
a mode for the production solely of pneumatic power (7), with the compressor (4) acting via the electric motor (9);
a mode for the production solely of electric power (8) with the electric generator (6) acting via the power module (1);
a mode for the production solely of power selected from pneumatic and hydraulic with power supply external to the aircraft, the compressor (4) or the hydraulic pump being turned by the electric motor (9); and
a start-up mode for the power module via the electric motor (9) and with said element being kept decoupled.

4. An auxiliary Power Unit of an aircraft, according to claim 2, further comprising a control module fitted with means for establishing a functioning mode selected from:
a mode for simultaneous generation of pneumatic, electric and hydraulic power;
a functioning mode for simultaneous generation of pneumatic power (7) and electric power (8);
a mode for simultaneous generation of hydraulic power and electric power (8);
a mode for the production solely of pneumatic power (7), with the compressor (4) acting via the electric motor (9);
a mode for the production solely of electric power (8) with the electric generator (6) acting via the power module (1);
a mode for the production solely of power selected from pneumatic and hydraulic with power supply external to the aircraft, the compressor (4) or the hydraulic pump being turned by the electric motor (9); and
a start-up mode for the power module via the electric motor (9) and with said element being kept decoupled.

5. An auxiliary Power Unit of an aircraft, according to claim 1, wherein the gearbox (5a) comprises coaxial shafts integrated into concentric shafts, said concentric shafts comprising elements selected from the electric motor (9), the electric generator (6), the main clutch (10), the secondary clutch (11), the pneumatic compressor (4), the hydraulic pump and a combination thereof.

6. An auxiliary Power Unit of an aircraft, according to claim 2, wherein the gearbox (5a) comprises coaxial shafts integrated into concentric shafts, said concentric shafts comprising elements selected from the electric motor (9), the electric generator (6), the main clutch (10), the secondary clutch (11), the pneumatic compressor (4), the hydraulic pump and a combination thereof.

7. An auxiliary Power Unit of an aircraft, according to claim 1, wherein the gearbox (5a) comprises non-coaxial shafts integrated into separate shafts which comprise elements selected from the electric motor (9), the electric generator (6), the main clutch (10), the secondary clutch (11), the pneumatic compressor (4), the hydraulic pump and a combination thereof.

8. An auxiliary Power Unit of an aircraft, according to claim 4, wherein the gearbox (5a) comprises non-coaxial shafts integrated into separate shafts which comprise elements selected from the electric motor (9), the electric generator (6), the main clutch (10), the secondary clutch (11), the pneumatic compressor (4), the hydraulic pump and a combination thereof.

* * * * *